United States Patent [19]

Fischer

[11] 4,182,651
[45] Jan. 8, 1980

[54] PULSED DEUTERIUM LITHIUM NUCLEAR REACTOR

[76] Inventor: Albert G. Fischer, Preinstrasse 132, 46 Dortmund-Wellinghofen, Fed. Rep. of Germany

[21] Appl. No.: 478,170

[22] Filed: Jun. 10, 1974

[51] Int. Cl.$^2$ ............................................. G21B 1/00
[52] U.S. Cl. ......................................... 176/8; 176/1; 176/9
[58] Field of Search ........................... 176/1, 3, 6, 8, 9

[56] References Cited

U.S. PATENT DOCUMENTS

| | | | |
|---|---|---|---|
| 3,214,342 | 10/1965 | Linhart | 176/8 |
| 3,313,707 | 4/1967 | Amsler | 176/8 |
| 3,748,475 | 7/1973 | Shatos et al. | 176/1 |

OTHER PUBLICATIONS

MATT–1050, 8/74, pp. 526–529.
Technology Review, 12/76, pp. 20–24, 32, 33, 39, 42, 43.
WASH–1267, 7/73, pp. 3–10.
NSENAO-58, no. 2, 10/75, pp. 107, 108, 119, 120, 162–165.

Primary Examiner—Harvey E. Behrend
Attorney, Agent, or Firm—Lane, Aitken & Ziems

[57] ABSTRACT

A nuclear reactor that burns hydrogen bomb material 6-lithium deuterotritide to helium in successive microexplosions which are ignited electrically and enclosed by this same molten material, and that permits the conversion of the reaction heat into useful electrical power. A specially-constructed high-current pulse machine is discharged via a thermally-preformed highly conducting path through a mass of the molten salt $^6$LiD$_{1-x}$T$_x$ ($0 < x < 1$). In the resulting dense, hot plasma filament primary nucleons are formed by field-accelerated fusion collisions. These hot particles initiate suprathermal multistepped propagating fission-fusion avalanches that heat the plasma by their own released energy up to thermonuclear temperature. The plasma is confined inertially and magnetically. Neutrons escaping sideways are utilized to breed tritium in the surrounding liquid blanket material, for participation in the next pulse. At the end of the current pulse and magnetic confinement the filament desintegrates and the nuclear fire is extinguished in the surrounding cold matter. The energy set free is insufficient to convert the blanket into a hot plasma in which chain reactions could propagate and escalate. The liquid blanket also serves as a neutron radiation shield. The shock wave is attenuated in it by a curtain of rising deuterium bubbles. The heat shock is buffered by partial melting of the external solid crust. The reaction heat is carried by the liquid metal of the external cooling jacket to the heat exchanger of the associated turbo-generator. Every few seconds, a new pulse can take place.

9 Claims, 2 Drawing Figures

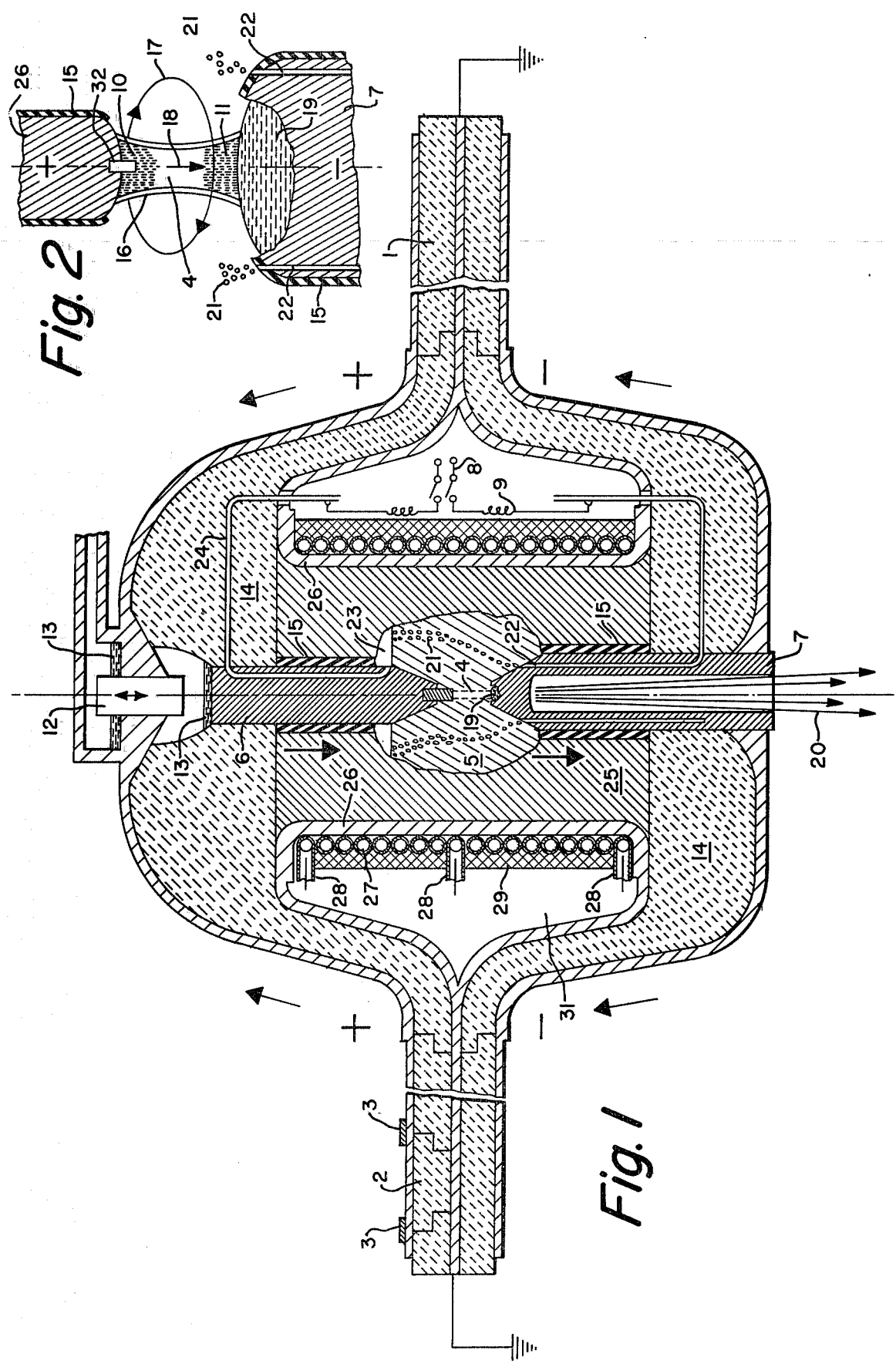

PULSED DEUTERIUM LITHIUM NUCLEAR REACTOR

CROSS-REFERENCES TO RELATED APPLICATIONS

The present invention relates to, and is an improvement on, the invention disclosed and claimed by my prior application Ser. No. 421,052, filed Dec. 3, 1973 which is a continuation-in-part of Ser. No. 361,211, filed May 17, 1973, now abandoned, and is disclosed in West German patent application No. P 24 11 667.4, filed Mar. 12, 1974.

BACKGROUND OF THE INVENTION

Large-scale nuclear fusion exists, so far, only in the form of the hydrogen bomb. The straightforward approach toward "taming the bomb" would be the downscaling of the macroexplosion into successive microexplosions of manageable size which can be ignited electrically instead of by a plutonium detonator and which proceed inside a suitable container which allows the recuperation of the blast energy as heat. This approach would employ the same material that has been proven effective in the bomb, and the same dense plasma conditions.

Strangely, this logical route has never been attempted with 6-lithium-deuterotritide, the hydrogen bomb material. The countless attempts at nuclear fusion that have been going on since 1956 at many places and at great expense and which have been, so far, quite unsuccessful, concentrate at dilute gas plasmas of deuterium gas and make no use whatsoever of the well-established processes that occur in an exploding hydrogen bomb.

As early as 1950 Ulrich Jetter has published what goes on in an exploding H-bomb: It is by no means the simple process that was assumed by Hans Thirring, who in 1946 invented the H-bomb by suggesting that a plutonium fission bomb be enclosed in a blanket of lithium hydride so that the p,$^7$Li reaction could take place. Jetter recognized the fact (already known to the military) that in the dense, hot plasma that is created by the Pu-detonator, neutrons from this detonator fission $^6$Li into energetic tritons and alphas, which can react with other deuterons, tritons and $^6$Li nuclei, thereby releasing more energetic nucleons, so that multiplicative chains are started. There is, as published later by McNally, a plethora of propagating and proliferating two-staged and three-staged reactions that can go on in a hot plasma consisting of $^6$Li, D and T, quite differently from the few direct thermonuclear fusion reactions that occur in a deuterium plasma.

This brings about a heretofore unrecognized possibility: The presence of $^6$Li which acts as a fuel and catalyst lowers the conditions under which a DT plasma can start "burning" and thus produce energy. The multiplicative fission-fusion chain reactions can be started at a lower plasma temperature than that needed for the direct thermonuclear D-D and D-T fusion reaction (about $10^8$ ° K.). There is evidence that these suprathermal avalanches can start propagating in a plasma that is only a few million degrees hot. The suprathermal avalanches which release their nuclear energy into the cold plasma which they permeate, thus heat the plasma up into the temperature range where direct thermonuclear reactions are possible. Therefore, the initial "igniting" temperature of the plasma which has to be created by external, electromagnetic forces, is very much lowered.

Therefore our task is to bring a plasma of solid-state density ($10^{23}$ nuclei/cm$^3$) consisting of $^6$Li, D and T and that is magnetically confined (because no material walls could withstand the temperature) to a temperature where avalanches can propagate in it. This very small volume of plasma must be enclosed by indestructable walls, so that the process can be repeated again and again. The provision of a non-deteriorating container that can withstand the nuclear microexplosions without deterioration is an important part of our task. We have to consider that each microexplosion has the explosive power of several pounds of TNT and is accompanied by a burst of heat and radiation, particularly neutrons which are hard to contain and render everything in their way dangerously radioactive. This multiple task is solved in the present invention.

The best way to create dense, hot microplasmas that are magnetically confined is the method of "wire explosions", where a fine wire is rapidly heated up by a strong current pulse. By thus exploding a thin-walled aluminum tube filled with deuterium gas Cheng has produced D-D fusions and counted $10^7$ neutrons per pulse. His current source was a 5 μF capacitor charged to 14 kV. Using a much more powerful and much more refined current pulse machine, Stephanakis et al. have "exploded" deuterated Nylon threads and achieved $10^{11}$ neutrons per pulse, partly by truly thermonuclear fusion reactions, partly by field-driven D-D collisions. Fischer (no kin) et al. discharged their capacitor bank through glass capillaries filled with liquid deuterated ammonia that was made conducting with dissolved $^7$Li and counted $10^7$ neutrons per pulse. Had they used ammonia that had been deuterotritided, and lithium- 6 for inducing the electronic conductivity in it, they might have been the first ones to ignite nuclear chain reactions electrically.

The next step is, then, to produce wire-explosion-like conditions in hydrogen-bomb material. The physico-chemical properties of Li$_2$DT are very suitable: The melting point is 688 ° C. The melt is a stable liquid. The specific heat, and the heat of fusion, are very high, higher than those of water. The melt is an ionic conductor, Li$^+$ being the cation, H$^-$ being the anion. Excess of Li increases the conductivity, excess of H decreases it. The ionic conductivity rises sharply with temperature.

With this last property we can imitate the "wire" characteristics that we need for producing the desired hot, dense plasma:

If we pass a strong current through molten Li$_2$DT between two collinear cylindrical electrodes, this current is initially spread out through a large volume of the molten salt. Since the material at the central axis becomes hotter, the current rapidly constricts itself into this hotter central filament, due to the strongly negative temperature coefficient of resistance.

The conductivity in this filament is about 1000 times higher than in the surrounding matter. At the cathode, Li is deposited by electrolysis, and the space in front of the anode is enriched with D and T, making the electrolyte there highly resistive.

Through this preformed conductivity channel or "wire", the current pulse machine (to be described below) is discharged. It can store about 500 000 Joule of energy and deliver it in about $10^{-7}$ seconds, producing a momentary current pulse peaking at $10^7$ amperes. The magnitude of this current is important to achieve efficient magnetic self-constriction of the hot filament. The current coverts the material in the channel instantly into a hot plasma. Due to the skin effect, the current flows only at the outside of the conducting filament, forming a sheath. The plasma in the filament cannot expand outwardly because the surrounding cold liquid cannot escape that fast but rather acts like a solid wall. A compression wave moves towards the geometrical axis of the channel. The pressure there rises to $10^8$ atm. or higher. The harmful "kink"-instability that is well-known from gas discharge pinch-effect experiments (see, e.g., the book by Glassberg and Lovstone: "Controlled Thermonuclear Reactions", Van Nostrand Reinhold, New York 1960) cannot occur here because the surrounding walls cannot be moved. However the "sausage"-instability is present, leading to magnetic constrictions and pinch-off of the current channel, much like a string of sausages. This effect is actually triggered near the anode by the D-T-enriched, highly resistive material there. By the locally increased electric field in these magnetically pinched-off sausage necks, nuclei are accelerated and shot into the plasma that stagnates in the following "sausages" of the filament (see page 276 of the quoted book), leading to nuclear fusion reactions. These field-induced primary D-D; D-T; T-T; D-$^6$Li and T-$^6$Li reactions produce energetic neutrons, alpha particles and deuterons which can "ignite" multiplicative avalanches. Some possible propagating chain reactions are $$^6Li + n \rightarrow t + \alpha + 4.8 \text{ MeV}$$
$$d + t \rightarrow n + \alpha + 17.6 \text{ MeV}$$
$$\Bigg\} \text{ suggested by Jetter}$$

(this one is unfavorable for magnetic confinement because the neutrons can escape and thus interrupt the chains)

$$d + d \rightarrow n + {^3}He + 3.3 \text{ MeV}$$
$$^3He + d \rightarrow p + \alpha + 18.4 \text{ MeV}$$
$$p + {^6}Li \rightarrow {^3}He + \alpha + 4 \text{ MeV}$$
$$\Bigg\} \text{ suggested by Post}$$

Other propagating fission-fusion chain reactions listed by McNally are:

$$^6Li + \alpha \rightarrow d + 2\alpha - 1.5 \text{ MeV}$$

$$d + {^6}Li \rightarrow 2\alpha + 22.4 \text{ MeV}$$

This chain is multiplicative, and it can be started by the abundantly-occurring energetic alpha particles. Other chains are

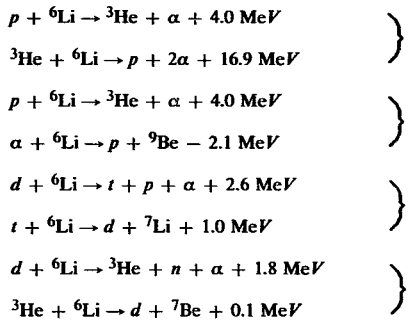

The energetic protons to start the first three chains can be produced by an initial, field-induced reaction such as $$d + d \rightarrow t + p + 4.0 \text{ MeV}$$

or $$n + d \rightarrow p + 2n - 2.2 \text{ MeV}$$

All these chains are interwoven and form the nuclear avalanche. The avalanche is spreading through the plasma in the general direction towards the cathode. It is bundled into the narrow filament by the strong azimuthal magnetic field that surrounds the current, according to $B = I/5\, r$. The magnetic field is higher than $10^6$ Gauss. Since the energy is transferred from hot nucleons to the colder plasma by means of elastic and inelastic coulomb collisions, and by the drag exerted by the electron gas, the cold plasma is rapidly heated up to thermonuclear temperatures where direct, single-stage fusion reactions (without suprathermal chains formation) become possible. The magnetic field separates the hot plasma from the surrounding cold matter. Only the neutrons can escape. They are utilized in the surrounding blanket for breeding tritium. The tritium is chemically bound and can participate in the next cycle. The more the reactor enriches itself in tritium, the easier it is to "ignite" the avalanches, because of the ease of the D-T reaction which requires only about 10 keV energy of the collision partners.

The erosion of the cathode, which is exposed to the nuclear avalanche, is reduced by the electrolytically-deposited pseudo-cathode of lithium, which is washed off after each pulse and preformed before each new one. The cathode can be protected with a self-healing liquid metal pool at its top. The electrodes can consist of beryllium or have beryllium inserts, so that the sputtered-off material dopes the molten salt with Be. This is beneficial for tritium breeding, due to the reaction $$n + {^9}Be \rightarrow 2n + 2\alpha - 1.7 \text{ MeV}; \quad n + {^6}Li \rightarrow t + \alpha$$

which doubles the neutrons and leaves only helium as the combustion product.

Toward the end of the current pulse (which lasts only about $10^{-7}$ sec) the magnetic confinement terminates and the plasma filament desintegrates. The reaction chains plunge into the surrounding cold matter where they are stopped. Use is made hereby of the long-known fact that an energetic nucleon has to pass, on the average, through at least $10^6$ atomic radii before it can hit head-on another nucleus and react with it. If the coulomb collisions with other, colder nuclei and electrons slow down the particle below reaction energy, the nuclear chain is interrupted. The reality of this phenomenon is self-evident from the fact that cold hydrogen bomb material can not be ignited by neutrons or other particle irradiation, such as the one emanating from the undercritical Pu detonator.

The plasma must have a minimum temperature of a few million degrees before chain reactions are possible in it. The higher temperature and the denser the plasma (degeneration), the lower the "drag" that is exerted onto energetic charged nucleons.

Therefore, the energy released by the microexplosion must be too small to heat a cylinder of the LiD blanket material that surrounds the channel to such a minimum temperature. This condition for non-escalation is easily fulfilled: With an assumed power release of $10^7$ Joule, a LiD cylinder of 3 cm radius and 10 cm length (assuming that the channel length is 10 cm) is heated to only about 5000° C. (~0.5 eV) which is much too cold for charged chain centers of MeV energy to propagate in and to arrive at other centers with sufficient energy to transgress the coulomb threshold. Thus, the nuclear fire is extinguished, after desintegration of the filament, like a burning match that is dipped into heavy oil.

The intriguing simplicity of the scheme according to this invention is based, amongst others, on this fact.

The magnitude of the energy pulse that is released can be controlled by the magnitude of the voltage of the current pulse machine. The maximum energy that can be safely accommodated per pulse is limited by the strength of the container. For the similar situation incurred with the currently fashionable laser-induced pellet explosion reactor, the maximum pulse size has been experimentally found (by dynamite explosions inside a vessel of 3 m diameter) to be about 200 MJ.

The mechanical shock wave which spreads with the speed of sound is attenuated by the compressibility of the molten salt, by a curtain of rising deuterium bubbles that are injected into the melt at the bottom, and by the crust of solid LiD that is coating the inner walls of the vessel. Near the ceramic lids this LiD layer is kept especially heavy so as to protect the ceramics from breakage.

The heat wave is buffered by the high specific heat of the molten salt, and by partial melting of the solid external LiD crust. The reaction heat is carried away to the associated turbogenerator by the liquid metal (e.g. liquid tin, which doubles also as a gamma ray shield) that is contained in the external cooling jacket.

The neutrons are moderated, and finally converted to tritium, in the Li$_2$DT charge of the container. Li$_2$DT is, after LiH, the best neutron moderator in existence.

In the foregoing description it was assumed that the nuclear reactions are started by field-induced collisions and by subsequent autocatalytic avalanches that heat the plasma up to fusion temperature. For the functioning of the present invention this is not necessary; it is also possible that the material in the filament is heated electro-magnetically all the way to thermonuclear temperatures.

Since the density n of the plasma is high ($\sim 10^{23}$ nuclei/cm$^3$) the time $\tau$/during which the thermonuclear equilibrium has to be maintained need only be brief, namely $10^{-9}$ sec, according to the well-known Lawson condition ($n\cdot\tau = 10^{14}$). Moreover, due to the presence in the plasma of $^6$Li which acts as a catalyst, the Lawson condition is eased by a factor of more than 3, as has been pointed out by J. R. McNally, Jr.

As compared to a gas pinch which freely expands and radiates into the surrounding vacuum, our dense, solid-state-enclosed hot filament has lower external losses, due to the baffle-effect of the solid blanket. Therefore, the attainment of fusion temperature by external, electrical heating is possible.

For supplying the high-current, high-voltage pulses, a generator such as the one employed by Stephanakis et al, can be used, which consists of a coaxial, water-dielectric capacitor and pulse line with integrated breakthrough switch, that is charged up by a Marx generator. When transmitted by the break-through switch, the pulse is then dielectrically up-transformed and shaped by a conically-shaped dielectric $\lambda/4$-transformer, also consisting of a water-filled coaxial tank, and delivered to the load via a field-emission diode. This pulse generator delivers 100 kJ in 50 nsec at 800 kV.

This general principle has been applied here too, however in a different form, to achieve an even higher power capability and greater compactness. As illustrated in FIG. 1, we basically use a concentric plate capacitor, because by its geometry it is the only capacitor that is completely free of inductance (except for the central discharge channel). This capacitor uses a ferroelectric ceramic dielectric, lead lanthanum zirconate titanate (abbreviated PLZT) which has a dielectric constant of 5000. The capacitor is domed up at its center to make room for the coaxial discharge vessel. This central dome is utilized to form a dielectric$\lambda/4$ transformer and pulse shaper so that the voltage delivered to the load can be many times as high as the voltage to which the capacitor had been charged. The current pulses have trapezoidal shape.

In order to integrate the concentric plate capacitor with its extremely low pulse impedance reflection-free to the coaxial reaction vessel at its center, the capacitor has been given a grounded middle electrode which is split near the center and is bent up to make connection to both ends of the cylindrical discharge vessel. The main discharge switch is integrated into the central electrode.

In this way the capacitor and the discharge chamber are forming an integrated, low-impedance and reflection-free pulse system. At a diameter of about 10 m, a plate distance of 1 cm, a charging voltage of about 100 kV, this power pulse generator can deliver about 500 kJ into the reaction channel without $10^{-7}$ sec.

The reaction heat is carried by the liquid metal of the external cooling jacket to the heat exchanger of the turbogenerator. Since the temperature of the hot metal is about 600° C., the conversion efficiency of the Rankine-cycle machine is about 40%. Without any further accessories the electrical energy that is needed to operate the reactor can be regained with that same percentage.

No neutron radiation can penetrate to the environment (except through a specially-provided neutron window in the lower electrode) because LiD is an excellent neutron moderator and absorber.

The power output of this reactor is estimated to about 10 kW, since a power pulse can take place only about every few seconds. Several reactors can be connected to one central turbogenerator. One prototype reactor could be manufactured and larger or smaller numbers of it could be ganged together to meet the local demand.

This reactor could satisfy the energy needs of humanity for thousands of years to come by burning up the hydrogen bomb material that is already in existence.

SUMMARY OF THE INVENTION

Filamentary, magnetically-confined and inertially-enclosed nuclear microplasms of solid-state density are produced repetitively in a large mass of 6-lithium deuterotritide (hydrogen bomb material) by extremely high current pulses of short duration that proceed between immersed electrodes along a thermally-preformed path at the center of this material. The ensuing nuclear microexplosions are buffered and contained by the surrounding liquid and solid material which forms a self-healing, indestructable container. The reaction heat is carried by the external cooling coil to the heat exchanger of the associated turbogenerator. Escalation into a macroexplosion is not possible because the energy released in the microexplosion is insufficient to heat the blanketing material into a hot plasma in which chain reactions could propagate. The reaction filament is newly formed in the molten salt before each pulse, and wiped out after each pulse. Constructional details are given for an especially simple current pulse supply.

BRIEF DESCRIPTION OF THE DRAWINGS

For a better understanding of the invention, reference may be had to the preferred embodiments exemplary of the invention in the accompanying drawing in which:

FIG. 1 is a schematic cross section through the pulsed D-Li reactor; and

FIG. 2 is an enlarged, fragmentary view of the electrodes showing the discharge path.

DESCRIPTION OF THE PREFERRED EMBODIMENTS

To further describe the invention, a complete working cycle is now described, with reference to FIG. 1:

The concentric plate capacitor 1 that is made up of overlapping ferroelectric ceramic tiles 2 that are soldered together at their metallic coatings by means of the metallic stripes 3, is charged up to about 100,000 volts. Then the conducting path 4 through the molten salt 5 is preformed between the electrodes 6 and 7 by supplying a current composed of ac and dc current from the supply and switch 8 via the choked leads 9 and the electrodes 6 and 7. The current constricts itself into a filament, and in front of the anode a D,T-rich area 10 is formed, in front of the cathode a Li-rich area 11. Then the main switch 12 is closed pneumatically. It consists of a pneumatically-driven piston that is wetted with liquid gallium 13 to prevent fretting. The capacitor 1 discharges through the preformed channel 4, its voltage being up-transformed and the pulse impedance being increased to match the load impedance, in the bell-shaped dielectric $\lambda/4$-transformers 14.

The current is prevented from spreading sideways through the LiD filling by the insulating sleeves 15 which cover the electrodes 6 and 7. These sleeves 15 are made of pyrolytically-deposited, knock-resistant boron nitride BN that is deposited by decomposing borazon. Due to the skin effect the current forms a sheath 16 that encloses the plasma channel 14. The constrictions due to the "sausage"-instability are not shown. The current is surrounded by the azimuthal magnetic field 17. Inside the channel 14 nuclear chain reactions 18 occur, and the charged particles are confined by the magnetic field 17. To minimize erosion, the cathode 7, besides being protected by the electrolytically-deposited lithium pseudo-cathode 11, bears a pool of molten metal 19 at its top which is self-healing. By proper choice of the metal it can be neutron-transmissive so that a neutron beam 20 can penetrate to the outside where it can be used for nuclear transmutations. In order to dampen the mechanical shock wave that spreads radially from the channel 4 due to the nuclear microexplosion, a deuterium bubble curtain 21 is created by injection of deuterium gas through the nozzles 22 into the molten salt 5. This gas is collected in the empty space 23 and removed for recirculation through the duct 24. The blast wave is further attenuated as it passes through the solid material 25 (that is kept especially thick near the ends of the cylinder 26 so as to protect the ceramic domes 14 from heat and shock) until it hits the metallic wall 26.

The reaction heat is carried away by liquid metal in the external cooling coil 27. This liquid metal enters and leaves through the exits 28 to and from the heat exchanger of the associated turbogenerator.

In order to start up the cold reactor at the beginning of operation, a heating jacket 29 is provided which is used to melt the LiD filling and the liquid metal. Heat loss to the outside is prevented by the insulating jacket 30. The empty, field-free space 31 can be used to house peripheral accessories.

It should be mentioned that inserts 32 can be provided in the electrodes 6 and 7 that consist of a mixture of isotopes such as plutonium-beryllium that emit energetic alpha particles, to provide the energetic nucleons that can start nuclear avalanches in the channel 4. These inserts 32 can also consist of pure $^9Be$ alone, so as to provide neutron multiplication and, through erosion and sputtering, doping of the melt 5 with beryllium in order to multiply the escaping neutrons for more abundant tritium breeding.

It is obvious that modifications and alterations of this general principle can be made without departing from the scope and spirit of the present invention.

What is claimed is:

1. A nuclear fusion reactor comprising a reaction chamber containing lithium deuterotritide, dielectric members closing opposite ends of said chamber, opposed electrodes extending through said dielectric members and spaced apart within the chamber to form a discharge path between them at the center of the chamber, heat exchange means adjacent the outer periphery of the chamber between the dielectric members to remove heat from the chamber and to maintain the temperature of said lithium deuterotritide below its melting point except in the region of said discharge path, means for repetitively establishing a reaction zone by passage of an electric current between said electrodes, and means for producing a high energy electrical discharge between the electrodes upon each reestablishment of said reaction zone.

2. A nuclear fusion reactor as defined in claim 1 in which said lithium deuterotritide is normally solid adjacent the side and ends of the chamber and liquid in the central region of the chamber where it is subject to heating during operation, the volume of lithium deuterotritide being such that an open space exists at the surface of the liquid, said space containing deuterium.

3. A nuclear fusion reactor as defined in claim 2 including a plurality of nozzles in one of said electrodes, and duct means for withdrawing deuterium from said space and recirculating it to said nozzles, the nozzles being positioned to inject said deuterium into the liquid at a plurality of points to form a curtain of bubbles in the liquid.

4. A nuclear fusion reactor as defined in claim 1 including a capacitor for producing said high energy discharge, said capacitor comprising parallel metal plates and ceramic dielectric material between the plates, said reaction chamber being disposed substantially at the center of said plates and said dielectric material being coextensive with the plates and including said dielectric members closing the ends of the chamber, the plates and dielectric members being spaced apart in the center region sufficiently to accommodate the chamber, and the dielectric members being of greater thickness than the rest of the dielectric material.

5. A nuclear fusion reactor as defined in claim 4 in which said capacitor includes a grounded metal plate coextensive with said first-mentioned metal plates and disposed centrally between them, said dielectric material being disposed between the ground plate and each of the first-mentioned plates, said chamber having a metal side wall and the ground plate being in contact with both ends of the side wall.

6. A nuclear fusion reactor as defined in claim 4 in which said dielectric material is lead-lanthanum zirconate titanate.

7. A nuclear fusion reactor as defined in claim 1 in which said reaction chamber has a metal side wall, an external cooling coil on said side wall, and means for circulating a liquid metal through said coil for removing heat generated in the reaction chamber.

8. A nuclear fusion reactor as defined in claim 1 in which at least one of the electrodes has an insert adjacent the discharge path of a radioactive material that emits alpha particles.

9. A nuclear fusion reactor as defined in claim 8 in which said insert comprises a mixture of plutonium and a radioactive isotope of beryllium.

* * * * *